May 23, 1972     D. C. MATTIS     3,664,726
OPTICAL SHUTTER FOR LASER OR MASER MODULATION
Filed Oct. 21, 1969
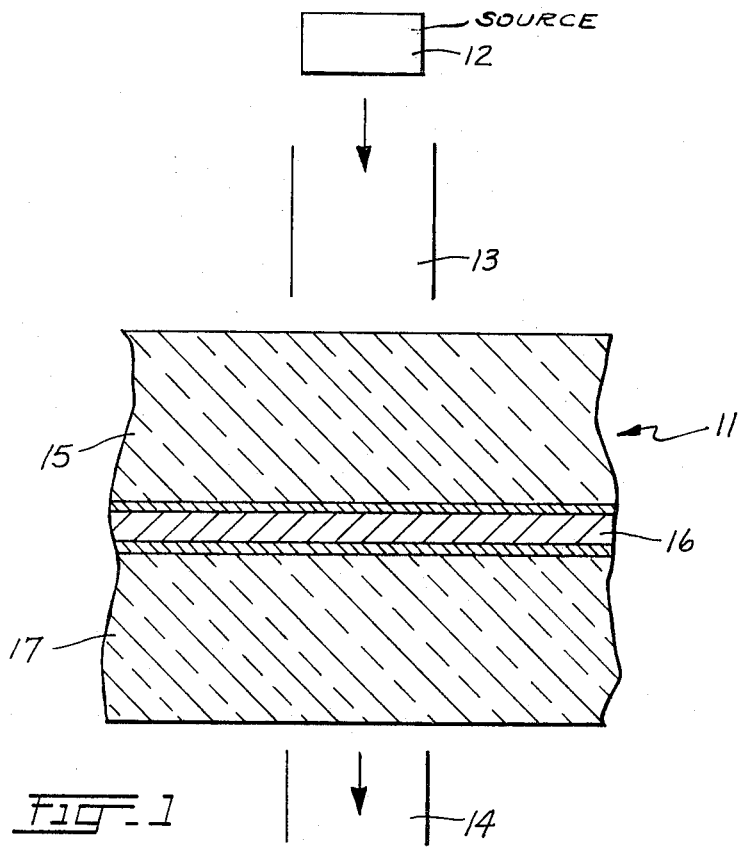
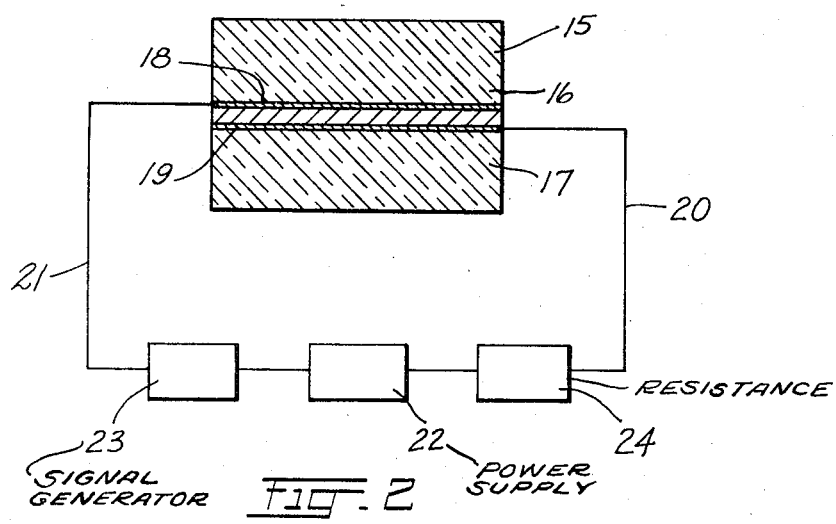
INVENTOR.
Daniel C. Mattis
BY
Attorney

United States Patent Office 3,664,726
Patented May 23, 1972

3,664,726
OPTICAL SHUTTER FOR LASER OR MASER MODULATION
Daniel C. Mattis, Scarsdale, N.Y., assignor to Yeshiva University, New York, N.Y.
Filed Oct. 21, 1969, Ser. No. 868,058
Int. Cl. G02f 1/36
U.S. Cl. 350—160                                                                       1 Claim

ABSTRACT OF THE DISCLOSURE

An optical shutter which is adapted to modulate a laser or maser or similar device is shown. The shutter includes a polyconducting device having a normally translucent member and a metallic oxide or metallic salt disposed thereupon. The metallic oxide or salt is adapted to undergo a Mott transition upon application of an impressed EMF by internal heating and is translucent below the Mott transition point but is reflective above this point. A signal generation device is coupled to the metallic oxide or salt and the singal produced is designed to bring the metallic oxide or salt to opposite sides of the Mott transition point.

DESCRIPTION OF THE INVENTION

This invention relates to an optical shutter device which is designed to permit modulation of a laser or maser to permit these devices to be utilized to transmit an intelligible signal.

It is well known that the most efficient signal transmission device, for many well-known applications, would be a laser or a maser beam. However, heretofore, it has been impossible within practical limits to modulate a laser or a maser beam to permit it to be used to transmit an intelligible signal. Modulation of a laser beam, must, of necessity, be done by some type of shutter device and, of course, there are a number of mechanical shutters available. However, such devices are merely "toys" because the speed produced are totally insufficient. Meaningful modulation requires electronic speeds in the nanoseconds which are totally beyond the capability of any mechanical device.

I have discovered that there are a series of transitional metallic oxides and metal salts which are capable of going through a "Mott transition" by the impingement of an EMF thereupon. The EMF produces internal heating within the material to produce the "Mott transition." Below the Mott transition point the metallic oxide is an insulator and normally will permit light to pass. Above the Mott transition point the device has the characteristics of a metal and will be reflective.

If such a metallic oxide or salt thereof, is placed in impingement with a laser or maser, and a signal generation device placed in operative relationship with the material, with the signal generation device so controlled so that the signal produced will cause the material to fall on either side of the Mott transition point, then modulation of the laser or maser will be produced at electronic speeds comparable to the pulses of the signal input.

The metallic oxides or metallic salts involved have been described in my co-pending application Ser. No. 819,506, filed Mar. 18, 1969, and now abandoned. These oxides or salts are those of transition-series elements and rare earth elements (atomic numbers 21 through 29, 39 through 46, 71 through 78 and 89 and higher and the Lanthanides). As illustrative of the metallic oxides involved iron oxide ($Fe_3O_4$) is mentioned. Others are the oxides of Sc, Ti, V, Cr, Rn, Co, Ni, Cu, Y, Zr, Nb, Mo, Tc, Ru, Rh, Pd, Ly, Hf, Ta, W, Re, Os, Tr, Pt, Ac, Th, Pa, U, La, Ce, and Eu. Salts of these metals can be the nitride, sulfate, sulfide and any other compound that will block the S and P electrons of the metal. The desired characteristics can also be obtained by controlling the Mott transition point by "doping" the materials by addition, for example, of donor impurities which will contribute or trap charges and thus will vary the Mott transition point.

Where iron oxide ($Fe_3O_4$) is used the speed of the device is at least —10 mHz. and greater speeds are believed to be possible.

The invention will now be further described by reference to the accompanying drawings which is made a part of this specification.

FIG. 1 is a diagrammatic view of the optical shutter of this invention (on an enlarged scale) in impingement with a laser or maser on one side and a receiving element on the opposite side.

FIG. 2 is a diagrammatic view of the structure and power supply of the optical shutter of this invention.

The invention will now be further described by reference to the specific form thereof as shown in the accompanying drawings. In this connection, however, the reader is cautioned to note that the specific form of this invention, as shown in the specification herein, is for illustrative purposes and for purposes of example only. Various changes and modifications can obviously be made within the spirit and scope of this invention.

Now referring to the specific form of this invention, as shown in the drawings herein, the optical shutter 11 of this invention is placed into impingement with a laser or maser diagrammatically indicated by 12. The laser or maser transmission area is indicated diagrammatically at 13, and the laser or maser receiving area is indicated diagrammatically at 14.

The optical shutter 11 consists of a pair of substrate members 15 and 17 which are translucent or transparent. This substrate could be, for example, glass, quartz, or the like. Between elements 15 and 17 is disposed a metal oxide or metal salt layer 16, which will permit light to pass in its insulating state but will not permit light to pass in its conducting state. Members 15 and 17 have a preferred thickness of 5,000 A. and element 16 has a preferred thicknes of 1,000 A.

In order to permit a current to efficiently flow through the device, a very thin aluminum layer 18 is placed on member 15 abutting layer 16 and a corresponding thin aluminum layer 19 is placed upon element 17 also abutting layer 16. These layers have a preferred thickness of 500 A., and are normally translucent because of the thickness of the layer involved. Preferably these layers are made of metallic aluminum, which is deposited on elements 15 and 17.

A conductor 20 and a conductor 21 are electrically connected to oxide layer 16 in spaced relationship therewith. a DC power supply 22, a signal generator 23 and a resistance 24 are also provided.

The Mott transition point of the material layer 16 is so chosen that the signal produced by the signal generator lies on opposite sides of this point. Thus, when the signal is generated the temperature within the material layer 16 is consequently raised and the pulses will force the material layer over the transition point. The material layer 16 permits light to pass below the Mott transition point but is reflective above it. Thus the pulses will cause the material layer 16 to become reflective in synchronization therewith. The laser beam impinging upon the shutter will thus be modulated in exact accordance with the pulses of the signal generator and at electronic speeds. The modulated beam can, of course, be decoded by a conventional receiving device.

It can also be seen that if a device is involved which will selectively absorb an EMF, and if this device will bring the metallic oxide or salt from above the Mott transition to below the Mott transition and if the signal generator is placed in operative relationship with the absorption device, similar modulation of the lasser will also occur.

The foregoing sets forth the manner in which the objects of this invention are achieved.

I claim:

1. An optical shutter adapted to modulate a laser or maser comprising, in combination, a pair of substantially planar translucent members having a thickness of approximately 5000 A. and a metallic oxide disposed therebetween, said metallic oxide selected from the class consisting of transition series elements and rare earth elements and having a thickness of approximately 1000 A., two metallic conductive layers having each thickness of approximately 500 A. disposed one on either side of said metallic oxide layer, said metallic oxide adapted to undergo a Mott transition and being normally opaque in its conducting mode and normally translucent in its insulating mode, a conductor operatively connected with each of said metallic layers, signal generation means connected to said conductor means, said signal generation means selectively bringing said metallic oxide layer to opposite sides of the Mott transition point as signals are generated, and means for impinging a laser or maser beam upon one face of said translucent members so that said beam will be selectively interrupted in passing from one face of said translucent members to the opposite face thereof.

References Cited
UNITED STATES PATENTS

| | | | |
|---|---|---|---|
| 3,484,722 | 12/1969 | Barker, Jr. et al. | 350—160 |
| 3,497,286 | 2/1970 | Morton et al. | 350—160 |
| 3,502,891 | 3/1970 | Boyle et al. | 350—160 |
| 3,509,348 | 4/1970 | Boyle et al. | 350—160 |

WILLIAM L. SIKES, Primary Examiner

V. P. McGRAW, Assistant Examiner